(12) United States Patent
Yalamanchi

(10) Patent No.: US 9,589,291 B1
(45) Date of Patent: Mar. 7, 2017

(54) IDENTIFYING MATCHING ITEMS IN AN ELECTRONIC CATALOG

(71) Applicant: Amazon Technologies, Inc., Reno, NV (US)

(72) Inventor: Aravind Yalamanchi, Lynnwood, WA (US)

(73) Assignee: Amazon Technologies, Inc., Reno, NV (US)

( * ) Notice: Subject to any disclaimer, the term of this patent is extended or adjusted under 35 U.S.C. 154(b) by 691 days.

(21) Appl. No.: 14/036,622

(22) Filed: Sep. 25, 2013

(51) Int. Cl.
*G06Q 40/00* (2012.01)
*G06Q 30/06* (2012.01)

(52) U.S. Cl.
CPC .................... *G06Q 30/0625* (2013.01)

(58) Field of Classification Search
CPC ........ G06Q 10/00; G06Q 20/00; G06Q 30/00; G06Q 40/00
USPC ...................................................... 705/3–44
See application file for complete search history.

(56) References Cited

U.S. PATENT DOCUMENTS

| | | | | |
|---|---|---|---|---|
| 7,013,290 | B2 * | 3/2006 | Ananian | G06F 17/30867 705/26.42 |
| 7,472,077 | B2 | 12/2008 | Roseman et al. | |
| 8,065,202 | B1 * | 11/2011 | Ballaro | G06Q 10/087 705/27.2 |
| 8,069,096 | B1 * | 11/2011 | Ballaro | G06Q 10/087 705/27.2 |
| 8,112,317 | B1 * | 2/2012 | Ballaro | G06Q 10/087 705/26.1 |
| 8,407,178 | B2 | 3/2013 | Hicks | |
| 8,706,562 | B2 * | 4/2014 | Scheinfeld | G06Q 20/12 705/26.1 |
| 2002/0062260 | A1 * | 5/2002 | Inoue | G06Q 10/087 705/20 |
| 2010/0293221 | A1 * | 11/2010 | Sidman | G06F 17/30855 709/203 |

* cited by examiner

*Primary Examiner* — Frantzy Poinvil
(74) *Attorney, Agent, or Firm* — Knobbe, Martens, Olson & Bear, LLP

(57) ABSTRACT

Systems and methods are provided for analyzing received item information for a number of items in order to determine whether each item is already included in an electronic catalog. The item information for each item may be analyzed in order to determine whether the received item information is a close match with any known item previously included in the electronic catalog. When close matches are found for one or more items, one or more modifications may be applied to at least a portion of the received item information in order to match stored item information for the corresponding close match. One or more rules associated with the determined modifications may then be generated and applied to receive item information for other items that fit certain determined criteria.

23 Claims, 6 Drawing Sheets

Bulk Inventory Loader

Welcome, John's Books (Logout)

Please use the below options to submit inventory in bulk that you would like listed for sale through our retail service.

Submit tab-delimited data for loading inventory to match to existing product pages:
1) Select file, or
2) Enter or paste item information below:

```
98JHFDERUF01     Red Shirt                      0793461407633  UPC      Clothing
738DGSJE111      Through the Looking Glass      1450594905     ISBN     Book
829472GHW-GH     ProSip Mug                                    Home     19.99
```

Submit

Fig.4.

IDENTIFYING MATCHING ITEMS IN AN ELECTRONIC CATALOG

BACKGROUND

Electronic commerce is a popular way of selling products, services and other items to consumers. A typical electronic commerce system may provide user interfaces that enable consumers to browse and/or purchase items from a merchant or seller associated with the electronic commerce system. Electronic systems that support user-to-user sales of items have also become popular. Sellers in such systems typically include both small merchants and non-merchant individuals. Item listings can typically be located using a search engine. In some cases, the user-to-user sales system is operated in association with a network-based retail store such that a customer can search a retail catalog, as well as a database of item listings from users, via a single search query.

Different sellers in an electronic marketplace will often use very different terminology to describe identical items. As a result, buyers seeking certain items often fail to find relevant listings. Further, small sellers sometimes fail to fully and accurately describe their items, resulting in lost sales and/or erroneous purchases. Some user-to-user sales systems seek to address such problems by allowing a seller to specify a Universal Product Code or other item identifier of an item being listed. This allows the system to associate different sellers' listings for a particular item. However, various problems may be encountered when a system attempts to match newly submitted item information from a seller with an existing item listed in an electronic catalog. For example, a seller may associate the seller's own internal item codes with items that the seller lists for sale, rather than a more universally known item identifier, or may incorrectly enter certain item information.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 4 is an illustrative user interface generated at least in part by a retail server that enables a user to enter or otherwise submit item information associated with items that the user would like to offer for sale.

DETAILED DESCRIPTION

Figure 1:
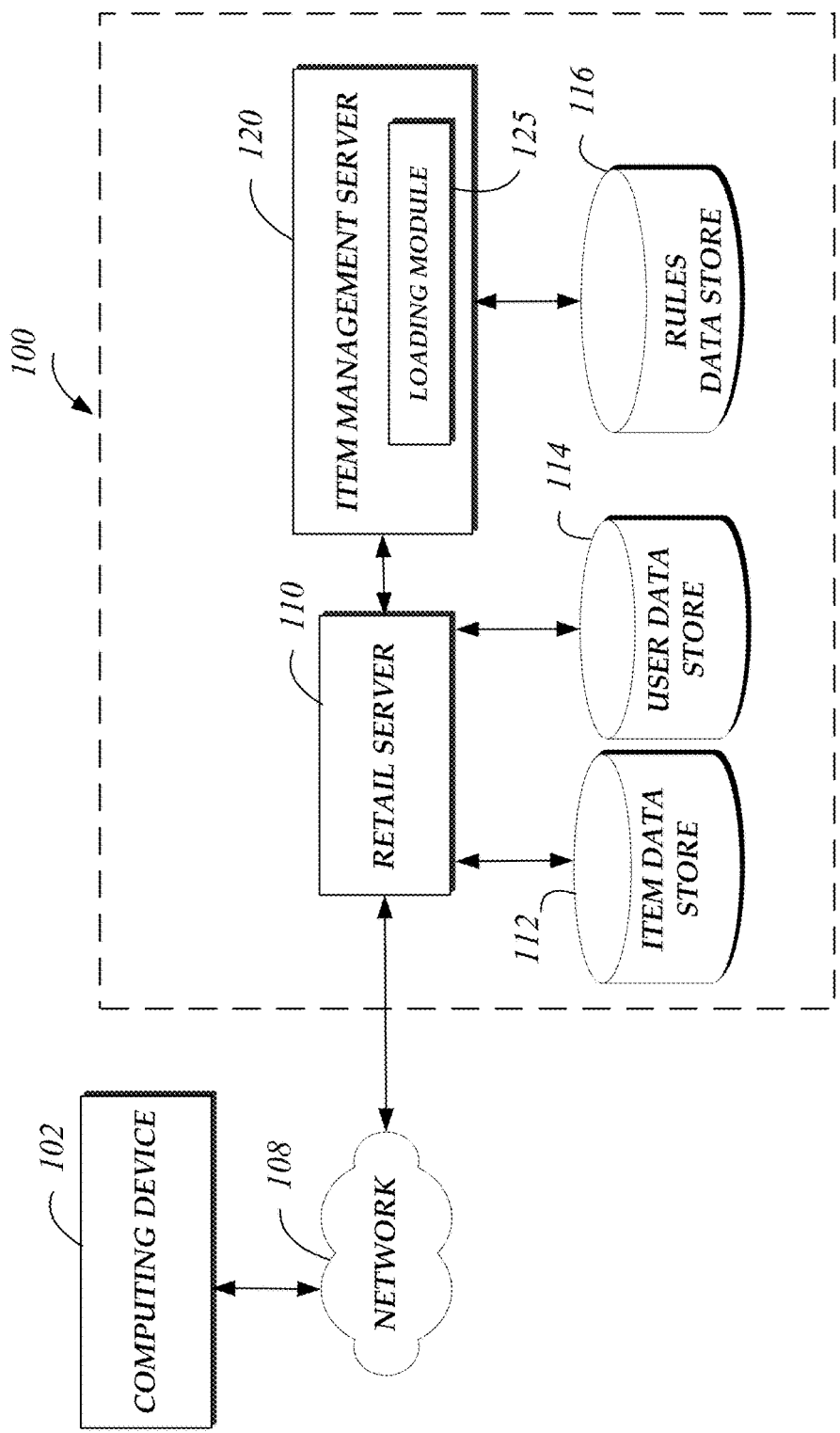
FIG. 1 is a block diagram depicting an illustrative operating environment for generating and applying rules for matching seller-submitted item information to items available in an electronic catalog.

Generally described, aspects of the present disclosure relate to analyzing received item information for a number of items in order to determine whether each item is already listed in an electronic catalog. For example, a seller may submit a list of items (which may each be identified by an item identifier and/or other item attributes provided by the seller) that the seller would like to list for sale via an electronic marketplace. An item management server, as disclosed herein, may analyze the item information for each item in order to determine whether the seller's listed item information matches (exactly or closely) item information for a known item previously included in an electronic catalog stored in association with the marketplace. When close matches are found for one or more items, the item management server may determine whether any normalization or other data modifications may be applied to at least a portion of the received item information in order to match stored item information associated with a known item in the electronic catalog. A close match for a submitted item's information may be, in some embodiments, an item for which some of the submitted item attribute values match corresponding item attribute values for the close match, but where other submitted attribute values are incorrect, slightly different or missing compared to the corresponding item attribute values for the close match.

In some embodiments, after identifying close matches, one or more rules may then be generated and applied by the item management server to received item information for other items that fit certain criteria, such as to item information for items received from a given seller, associated with a given item category, associated with a given item brand and/or other criteria. The rules may be generated, for example, based on recognized patterns or common differences between multiple seller-submitted items' item information and item information of corresponding close matches in the electronic catalog. After applying rules to normalize or otherwise correct incoming item information, the electronic catalog may be updated to identify which sellers have a given item for sale (in the case that a received item information is normalized to match an existing catalog item). In the case that the item management server determines that item information for a given item does not match any known catalog item, even after normalization or other modification, a new item entry may be created for the item in the electronic catalog.

In some embodiments, a marketplace system, as described herein, may include a data store of information about products or other items that may be listed for sale by sellers, merchants and/or other users (hereinafter such sellers, merchants and/or other users may be referred to generally as "sellers"). The item information in this data store may be viewable by end users through a browsable electronic catalog in which each item may be described in association with a corresponding network page describing the item (hereinafter, an "item detail page"). Each item detail page may include, for example, an item image and description, customer ratings, customer and professional reviews, sales rank data, lists of related items, and/or other types of supplemental data that may assist consumers in making informed purchase decisions. Users of the system may, in some embodiments, locate specific item detail pages within the electronic catalog by executing search queries, navigating a browse tree, and/or using various other navigation techniques.

In some embodiments, in order for a seller to list a particular item for sale via the marketplace, the seller may browse to the detail page for that item and then select an option for adding a listing. Because detailed information already exists within the electronic catalog for that item, there is no need for the seller to supply a complete description of the item. For example, in one embodiment, the seller can simply specify the condition and selling price of the particular unit of the item. Because the seller need not supply a detailed item description, listings may be added more rapidly and efficiently.

To accommodate volume sellers, the marketplace system may also provide a bulk uploading service that permits sellers to add multiple listings at a time without first browsing to the associated item detail pages. When a bulk-uploaded listing record does not specify a standard-format item identifier, the bulk uploading service may execute a search routine to attempt to match the listing record to a corresponding item record of an item represented in the electronic catalog. When no exact match is found in the electronic catalog, as discussed in more detail below, a loading module described herein may attempt to identify potential close matches in the electronic catalog for the submitted item information. The loading module may, in some embodiments, generate one or more rules based on analysis of the received item information for a number of different items. The generated rules may be applied, in some embodiments, to a subset of received items' item information in order to normalize or otherwise modify the received data to match items previously included in the electronic catalog.

Seller-provided data may be provided using an inventory loader user interface, uploading a spreadsheet, text file or other file, using an application or application programming interface ("API") provided by the operator of the retail server, and/or in other ways, depending on the embodiment. In one embodiment, a seller may submit a tab-delimited or comma-separated file that includes entries for a number of different items that the seller would like to add to the catalog in bulk. In some embodiments, entries for each item may include one of more of a stock-keeping unit ("SKU") established by a merchant or seller, a unique identifier established by the manufacturer or other entity, a price, an item condition, a quantity, various shipping options, tax properties, item notes and/or various attributes of the item. Unique identifiers provided for an item may include, for example, a Universal Product Code ("UPC"), an International Standard Book Number ("ISBN"), a European Article Number ("EAN") and/or a unique identifier established by the operator of the retail server 110. In some embodiments, one or more of the unique identifiers provided may be considered a Global Trade Item Number ("GTIN"). Item attributes may include, for example, size, color, manufacturer, weight, and/or others. It will be appreciated that some item attributes may be specific to a given item type. Item attributes for a book, for example, may include book title, author, publisher and page count, while item attributes for an item of clothing may include size, color, designer, gender, etc.

Stored item attribute data, in some embodiments, may include both item attributes and item attribute values. Example item attributes for a given item, such as a running shoe, may include "Title," "Color," "Size," "Fabric Type," "Brand Name," "Sole Type," etc. An item attribute value is a value associated with a given item attribute. For example, the "Fabric Type" item attribute for a given item, such as running shoes, may have an associated item attribute value of "leather." In some embodiments, the electronic catalog may include the same set of attributes for all items, or for all items in a given item category, but for a given item may only include associated item attribute values for a subset of the item attributes. For example, an item attribute of "Sole Type" may be stored for both a running shoes item and a wristwatch item, but there may be no associated item attribute value stored for the wristwatch item, because, for example, the "Sole Type" attribute is not relevant to a wristwatch. In other embodiments, an item attribute for a given item may only be included in the electronic catalog if an associated item attribute value is also included.

To assist potential buyers in efficiently locating the marketplace listings for a particular item, each item detail page may present or summarize the existing marketplace listings for the corresponding item. These listings may be associated with a variety of different sellers (including individuals and/or merchants), and may be for both new and used units of an item. Thus, by accessing the detail page for a particular item, a buyer can efficiently and accurately locate all of the current marketplace listings for that item, as well as view detailed item information from the electronic catalog (such as item images, third-party item reviews, and/or other information). The user may also compare the prices, item conditions, and/or other parameters of the various listings, and can initiate purchasing of the item from a particular desired seller.

In some embodiments, the association of item listings to individual item detail pages may be accomplished at least in part through the use of a unique identifier associated with each item. The unique identifiers can include UPCs, ISBNs, and other types of standard item codes. In some embodiments, even if an item already has a standardized identifier (such as an ISBN or UPC) associated with it, each item in the catalog may be assigned a standard unique identifier assigned by the marketplace. According to some embodiments, the marketplace may use the standard unique identifier as an index to relate or otherwise associate information in various databases with each other to, for example, generate item detail pages for each unique item and group seller listings for the item.

The illustrative operating environment shown in FIG. 1 includes a marketplace system 100 that enables users to browse and place orders for items (such as items listed in an electronic catalog), as well as submit item information for items to be offered for sale to other users. The marketplace system 100 may include one or more item management servers 120 including a loading module 125 that may be used to implement various aspects of the present disclosure, such as processing item submissions from sellers and matching items submitted by sellers to existing items listed in an electronic catalog. The marketplace system 100 may also include one or more retail servers 110 that facilitate electronic browsing and purchasing of items, such as digital content items, using various user devices, such as computing device 102. Those skilled in the art will recognize that the computing device 102 may be any of a number of computing devices that are capable of communicating over a network including, but not limited to, a laptop, personal computer, personal digital assistant (PDA), hybrid PDA/mobile phone, mobile phone, electronic book reader, digital media player, tablet computer, game console, game controller, and the like.

The item management server 120, which will be described below in more detail, may be connected to or in communication with a rules data store 116 that may store rules generated by the item management server 120 to be applied to seller-submitted item information for items meeting identified criteria in order to normalize or otherwise modify the received information to match (or be more likely to match) items previously identified in the electronic catalog. The retail server 110 may be connected to, or in communication with, an item data store 112 that stores item information regarding a number of items, such as items listed in an electronic catalog as available for browse and/or purchase via the retail server 110. Item data stored in item data store 112 may include any information related to each item. For example, item data may include, but is not limited to, price, availability, title, item identifier, item feedback (e.g., user reviews, ratings, etc.), item image, item description, item attributes, keywords associated with the item, etc. In some embodiments, the item data store 112 may store digital content items (e.g., audiobooks, electronic books, music, movies, multimedia works, text documents, etc.). In other embodiments, the information in item data store 112 and rules data store 116 may be stored in a single data store connected to or in communication with the item management server 120 and/or retail server 110.

The retail server 110 may also be connected to, or in communication with, a user data store 114 that stores user data associated with users of retail server 110, such as purchase history, browsing history, item reviews and ratings, personal information, user preferences, location information, activity information, context consumption history associated with specific contexts, etc.

In different embodiments, each of item data store 112, user data store 114 and/or rules data store 116 may be local to item management server 120, may be local to retail server 110, may be remote from both item management server 120 and retail server 110, and/or may be a network-based service itself. In the environment shown in FIG. 1, a user of the marketplace system 100 may utilize computing device 102 to communicate with the retail server 110 via a communication network 108, such as the Internet or other communications link. The network 108 may be any wired network, wireless network or combination thereof. In addition, the network 108 may be a personal area network, local area network, wide area network, cable network, satellite network, cellular telephone network, etc. or combination thereof. Protocols and components for communicating via the Internet or any of the other aforementioned types of communication networks are well known to those skilled in the art and, thus, are not described in more detail herein.

The marketplace system 100 is depicted in FIG. 1 as operating in a distributed computing environment including several computer systems that are interconnected using one or more computer networks. The marketplace system 100 could also operate within a computer system having a fewer or greater number of components than are illustrated in FIG. 1. Thus, the depiction of marketplace system 100 in FIG. 1 should be taken as illustrative and not limiting to the present disclosure. For example, the marketplace system 100 could implement various Web services components and peer-to-peer network configurations to implement at least a portion of the processes.

In brief, the retail server 110 is generally responsible for providing front-end communication with various user devices, such as computing device 102, via network 108. The front-end communication provided by the retail server 110 may include generating text and/or graphics, possibly organized as a user interface using hypertext transfer or other protocols in response to information inquiries received from the various user devices. The retail server 110 may obtain information on available goods and services from one or more data stores, such as item data store 112, as is done in conventional electronic commerce systems. In certain embodiments, the retail server 110 may also access item data from other data sources, either internal or external to marketplace system 100. While marketplace system 100 illustrates an embodiment in which the item management server 120 communicates with a retail server 110, in other embodiments, an item management server 120 may operate independently of a retail environment. For example, the item management server may be operated in association with a service that provides information and/or reviews regarding products, services, movies, people, events and/or items of various other types without necessarily enabling purchase of items. In such embodiments, the item management server 120 may communicate with the computing device 102 and/or item data store 112 without the presence of a retail server. In other embodiments, the computing device 102 or retailer server 110 may include a loading module, as described herein, such that a separate item management server may not be present in certain embodiments.

Figure 2:
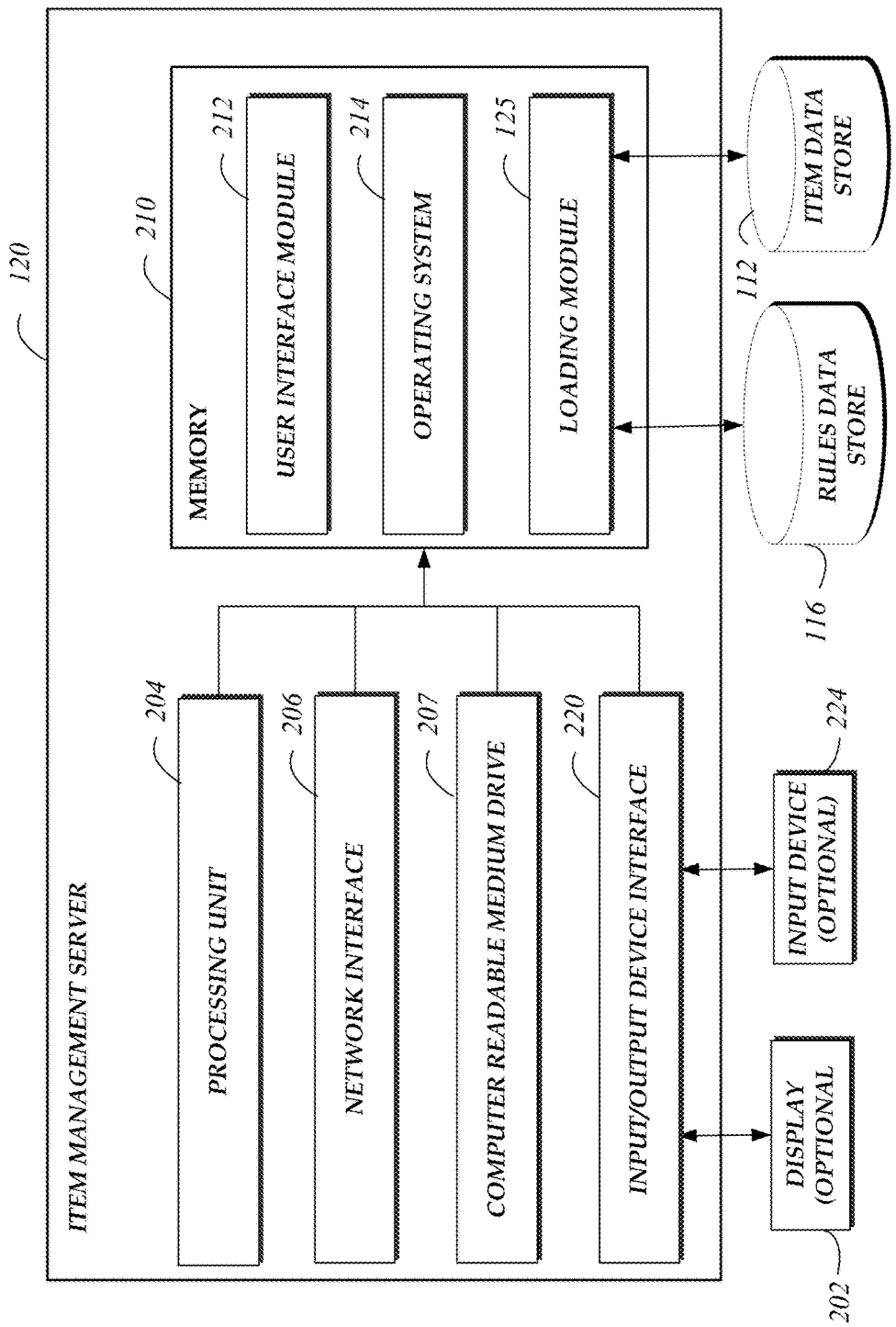
FIG. 2 depicts a general architecture of a computing device for processing item information submitted by a seller and generating rules for normalizing or modifying portions of submitted item information.

FIG. 2 depicts an example of a general architecture of an item management server 120 for processing submitted item information and generating rules for modifying received item information to match pre-existing item information stored in an electronic catalog. The general architecture of the item management server 120 depicted in FIG. 2 includes an arrangement of computer hardware and software components that may be used to implement aspects of the present disclosure. The item management server 120 may include many more (or fewer) components than those shown in FIG. 2. It is not necessary, however, that all of these generally conventional components be shown in order to provide an enabling disclosure. As illustrated, the item management server 120 includes a network interface 206, a processing unit 204, an input/output device interface 220, a display 202, an input device 224, and a computer readable medium drive 207, all of which may communicate with one another by way of a communication bus. The network interface 206 may provide connectivity to one or more networks or computing systems. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, microphone, touch screen, etc.

The memory 210 contains computer program instructions that the processing unit 204 executes in order to implement one or more embodiments. The memory 210 generally includes RAM, ROM and/or other persistent, auxiliary or non-transitory computer-readable media. The memory 210 may store an operating system 214 that provides computer program instructions for use by the processing unit 204 in the general administration and operation of the item management server 120. The memory 210 may further include computer program instructions and other information for implementing aspects of the present disclosure. For example, in one embodiment, the memory 210 includes a user interface module 212 that generates user interfaces (and/or instructions therefor) for display upon a computing device, e.g., via a navigation interface such as a browser installed on the computing device. In addition, memory 210 may include or communicate with an auxiliary rules data store 116, item data store 112 and/or one or more other data stores, as discussed above with reference to FIG. 1.

In addition to the user interface module 212, the memory 210 may include a loading module 125 that may be executed by the processing unit 204. In one embodiment, the loading module 125 implements various aspects of the present disclosure, e.g., identifying differences between received item information and close matching items in the electronic catalog, generating rules for normalizing or otherwise modifying submitted item information, etc., as described further below. While the loading module 125 is shown in FIG. 2 as part of the item management server 120, in other embodiments, all or a portion of a loading module may be a part of the retail server 110 and/or a user computing device, such as computing device 102. For example, in certain embodiments of the present disclosure, the retail server 110 may include several components that operate similarly to the components illustrated as part of the item management server 120, including a user interface module, loading module, processing unit, computer readable medium drive, etc. In such embodiments, the retail server 110 may communicate with a rules data store, such as rules data store 116 and the item management server 120 may not be needed in certain embodiments. Further, although certain examples are illustrated herein in the context of a retail server 110, this is not a limitation on the systems and methods described herein.

Figure 3:
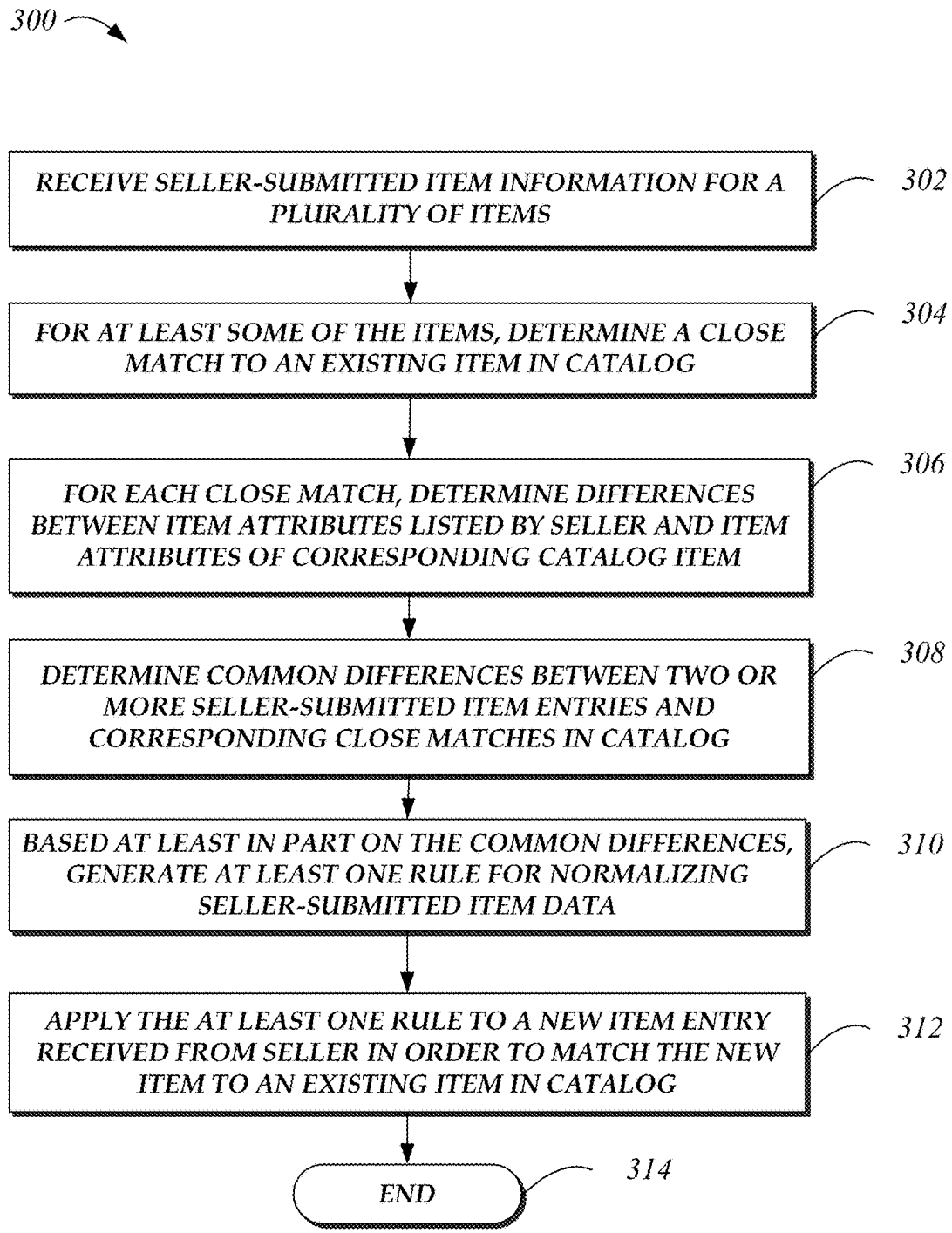
FIG. 3 is a flow diagram of an illustrative method for generating and applying rules for normalizing or otherwise modifying seller-submitted item information.

FIG. 3 is a flow diagram of an illustrative method 300 implemented by the loading module 125 for generating and applying rules for normalizing received item information. While illustrative method 300 is described below with reference to item information submitted by a seller, in other embodiments, it will be appreciated that a user other than a seller may submit item information. Similarly, in some embodiments, illustrative method 300 may be implemented outside of a retail environment, such as in association with a system that provides information and/or reviews regarding products, services, movies, people, events and/or items of various other types without necessarily enabling purchase of items. The illustrative method begins at block 302, where item information for a number of items is received. The item information may have been submitted to the retail server 110 by a seller, for example, that would like to offer for sale one or more units of the identified items via the marketplace system 100. In some embodiments, the item information may have been submitted as a result of a seller interacting with a user interface similar to the bulk inventory loader user interface described below with reference to FIG. 4. In other embodiments, a seller may have submitted item information by sending a file that lists items to the retail server, sending a message to an operator of the retail server, or using any other method of communicating data. Upon receiving the item information, in some embodiments, the loading module 125 may parse the received data to separate the item information for different items and to determine identified item attribute values submitted for each item.

At block 304, the loading module 125 may determine, for at least some of the items for which item information was submitted, a close match to an existing item listed in the electronic catalog. A close match for a submitted item may be determined, for example, by comparing the submitted item information for the item to stored item information in item data store 112 for a number of items in order to identify the closest matching item in the electronic catalog. A close match may be, in some embodiments, an item for which some of the submitted item attribute values match corresponding item attribute values for the close match, but where other submitted attribute values are incorrect, slightly different or missing compared to the corresponding item attribute values for the close match. As an example according to one embodiment, if a submitted item identifier for a seller-submitted item does not match any unique item identifiers for items in the electronic catalog (or is not included at all in the submitted item information), the loading module 125 may identify one or more close matches as items in the electronic catalog that match a number of other item attribute values in the submitted item information, such as item name or title, brand, release date, page count and/or others.

In some embodiments, the loading module 125 may consider items in the electronic catalog with item attribute values that are similar to submitted attribute values as being potential close matches. For example, an item attribute value with a slight misspelling (such as a brand of "Bellmont" instead of "Belmont"), missing or adding leading or trailing digits or characters (such as a part number of "00562" instead of "562," or "123-D" instead of "123") and/or having a similar meaning (such as a color of "red" instead of "crimson") may be weighted higher in determining close matches than if the given submitted item attribute value and stored item attribute value did not have such similarities. In some embodiments, the loading module 125 may retrieve a lookup table that includes associations between various item attribute values and common typos, synonyms, misidentifications and/or other common incorrectly listed submissions.

As will be appreciated, submitted item information for some items listed by the seller may match existing catalog information exactly, such as by the seller providing a unique identifier and item title that are each exact matches with stored item information for an item identified in the electronic catalog. In some embodiments, for such exact matches, the loading module 125 may process these matching items without considering them for the additional pattern matching analysis, rule generation and other blocks of illustrative method 300 discussed below. Instead, for example, the loading module 125 may update availability information associated with the matching item in the electronic data store stored in item data store 112. Updating the availability information may include, for example, storing information indicating that an additional unit of the matching item is available for sale from the seller that submitted the item information.

Once the loading module 125 has determined a close match for each of at least some of the submitted items, the illustrative method proceeds to block 306. At block 306, the loading module 125 determines, for each close match, one or more differences between the item attribute values listed by the seller and corresponding item attribute values of the close match in the electronic catalog. For example, the loading module 125 may compare each item attribute value stored in association with the close match in the electronic catalog with the submitted item attribute value, if any, for the corresponding attribute in the seller-submitted information. A sample result may be, for example, that a seller's submission differs in its submitted unique item identifier for an item by missing leading characters associated with the brand name (such as the seller submitting a unique identifier of "89JK8217" and brand "ABC Co.," while the closest match has a unique identifier of "ABC-89JK8217"). Another sample result may be, for example, that a seller's submission differs in its submitted part number for an automotive item by missing trailing digits that indicate color (such as the seller submitting a part number of "9716" and a color of "Black," while the closest match has a part number of "9716-BLK").

At block 308, the loading module 125 determines one or more common differences between two or more seller-submitted item entries and corresponding close matches in the electronic catalog. The loading module 125 may, for example, compare the differences determined at block 306 for each of the seller-submitted items relative to the corresponding closest match in the electronic catalog in order to identify repeated differences or patterns in the differences. For example, the loading module 125 may determine that the submitted item information for a first item and a second item each differ from the respective item's closest item match in the electronic catalog by missing a portion of the given item's unique identifier that corresponds to the brand of the item. As another example, the loading module 125 may determine that the seller has repeatedly listed the same incorrect brand name for a number of items that otherwise match the respective close match in the electronic catalog for a number of other item attribute values. Depending on the embodiment, the loading module 125 may employ any of a number of known pattern matching techniques, neural networks, and/or other known artificial intelligence or data mining techniques in order to identify patterns, themes or logical connections in the differences between the various seller-submitted data and corresponding close matches in the electronic catalog.

In some embodiments, the loading module 125 may logically separate items into various buckets before determining patterns or other commonalities among the differences identified at block 306. For example, according to some embodiments, a subset of submitted items may be determined to belong to the same bucket as each other based at least in part on the items being submitted by the same seller as each other, being associated with the same brand as each other, being associated with the same item type or item category as each other, and/or having one or more other preselected item attributes in common. As one example according to one embodiment, the loading module 125 may analyze books listed in the submitted item information for a given seller separately from analyzing clothing items submitted by the same seller. As another example according to another embodiment, the loading module 125 may consider the submitted item information from a number of different sellers for items of a certain brand as belonging to the same bucket, despite being received at different times and from different sellers, and may analyze the various sellers' submitted information for patterns across sellers. A "bucket" of items may also be referred to herein as a "group" of items.

Next, at block 310, the loading module 125 may generate at least one rule for normalizing or otherwise modifying the seller-submitted item data based at least in part on the one or more common differences determined at block 308. The generated rule may then be stored, for example, in rules data store 116. In some embodiments, the loading module 125 may generate the rule in the form of one or more regular expressions, a portion of executable code, a script and/or other format. The rule may indicate, according to some embodiments, the item attributes and/or attribute values that describe the applicable bucket of items (such as items of a specified brand and/or received from a specified seller) and the data transformations or modifications to be made to receive item information for items belonging to the bucket.

In some embodiments, the data modifications described by the rule may include conditional statements. For example, one determined rule may indicate that any received part number for a specific brand of car parts should have a dash followed by three digits added to the received part number (according to a specified lookup table or rule set) if the received part number is seven digits in length and missing a dash. This example rule may have been determined based on a determination at block 308 that a seller's submitted part number for two or more different car parts of the given brand each differed from car parts associated with known items in the electronic catalog at least in part by missing a dash and three digits corresponding to a vehicle type for the car part. The loading module 125 may have retrieved a lookup table, for example, indicating that seller-submitted values for a vehicle type attribute for each of these items corresponded to a certain three-digit suffix that should be added to the end of the submitted part number.

In some embodiments, the loading module 125 may determine that a rule based on a common difference identified at block 308 should be generated based at least in part on the number or percentage of items in the relevant bucket of received item information for which applying the rule results in the modified item information matching item information for an item included in the electronic catalog. For example, the determined percentage may be compared against a predetermined threshold percentage of items (such as 90% or more, according to one embodiment) or the determined number of items may be compared against a predetermined threshold number of items (such as three or more items, according to one embodiment). In some embodiments, the threshold percentage or number of items may vary depending, for example, on the seller, the item category, the relevant item attribute types, the extent of difference between submitted item attribute values and the modified item attribute values and/or other factors. In some embodiments, a confidence score may be determined and stored in association with the rule based at least in part on how common a given error or difference in submitted item information is across a given seller's submitted item information, across a number of different sellers' submitted item information and/or across submissions to the electronic catalog as a whole.

In some embodiments, some or all of the normalization rules determined by the item management server 120 may be ranked, ordered and/or assigned a confidence score based at least in part on the relative commonality or the frequency with which the given normalization applies to seller-submitted information. For example, according to one embodiment, if a seller uses spaces instead of hyphens in part numbers, such an error may be deemed common enough (such as based on many sellers making this common mistake) that the accompanying normalization rule is assigned a high confidence. On the other hand, for example, a misspelling of a brand name may have a low confidence if such error is rare. In some embodiments, when a suggested normalization rule has a confidence score below a given threshold (such as 90%, according to one embodiment), the item management server 120 may request that the seller confirm the rule before it is applied. In some such embodiments, rules above the given threshold may be automatically applied without prompting the seller. According to some embodiments, when a confidence score for a given rule reaches a first threshold, the rule may be automatically applied to a particular seller's submitted item information (which may be considered a seller-specific rule), while a higher second threshold may be set before the rule will be applied to other sellers' information (which may be considered a global rule).

In some embodiments, once the loading module 125 has generated at least one rule for normalizing or otherwise modifying incoming item information, the loading module 125 may store the rule for later use in rules data store 116. In some embodiments, the illustrative method 300 may then proceed to block 312, where the loading module 125 applies the at least one generated rule to a new item entry received from the seller in order to match a new item to an existing item in the electronic catalog. For example, the loading module 125 may receive item information for additional items submitted from the seller, determine that the rule is applicable to the new item (which may be based, in some embodiments, at least in part on a bucket to which the new item belongs and/or conditional statements stored in associated with the rule) and then apply the rule in order to modify the received item information for the new item. The modified item information may then be matched with an existing item in the electronic catalog and/or added as a new entry to the electronic catalog as appropriate, which is discussed in more detail above.

As will be appreciated, in some embodiments, applying the at least one rule at block 312 may occur either a short time or a long time after the rule was generated at block 310. For example, in some embodiments, the rule may be applied to a subset of the same submitted list of item information as that received at block 302. In other embodiments, the rule may be applied to item information that the seller submits separately days, weeks or months after the submission at block 302. In some embodiments, depending on how the bucket of items was defined, the at least one rule may be applied to incoming item information received from sellers other than the seller that submitted the item information from which the rule was generated. The illustrative method 300 ends at block 314.

FIG. 4 is an illustrative user interface 400 generated at least in part by the retail server 110 that enables a user to enter or otherwise submit item information associated with one or more items that the user would like to offer for sale via the marketplace system 100. For example, the illustrative user interface 400 may be generated based at least in part on a seller's request to submit bulk inventory data for a potentially large number of items that the user would like to sell to other users of the marketplace system 100. As shown, the user interface 400 is displayed via a browser operating upon a computing device, such as computing device 102, utilized by a user. In other embodiments, a similar user interface may be presented to a user outside of a browser context.

As illustrated, the user interface 400 includes an option for selecting to upload or otherwise submit a file to the retailer server 110. One acceptable file type may be, according to some embodiments, a tab-delimited or comma-separated text file that lists item attribute values for each item in a list of items. Depending on the embodiment, the loading module 125 may be configured to parse files of a variety of types, including variously formatted text files, spreadsheet files, encrypted files and/or proprietary file types that include inventory data. As another option, user interface 400 includes a text entry form or field 404 in which the user may type or electronically paste tab-delimited item information or other formatted text data. As illustrated, the user has entered item information for a number of different items in field 404. Once the user is ready to submit the entered information to the marketplace system 100, the user may select the submit option 406.

Figure 5:
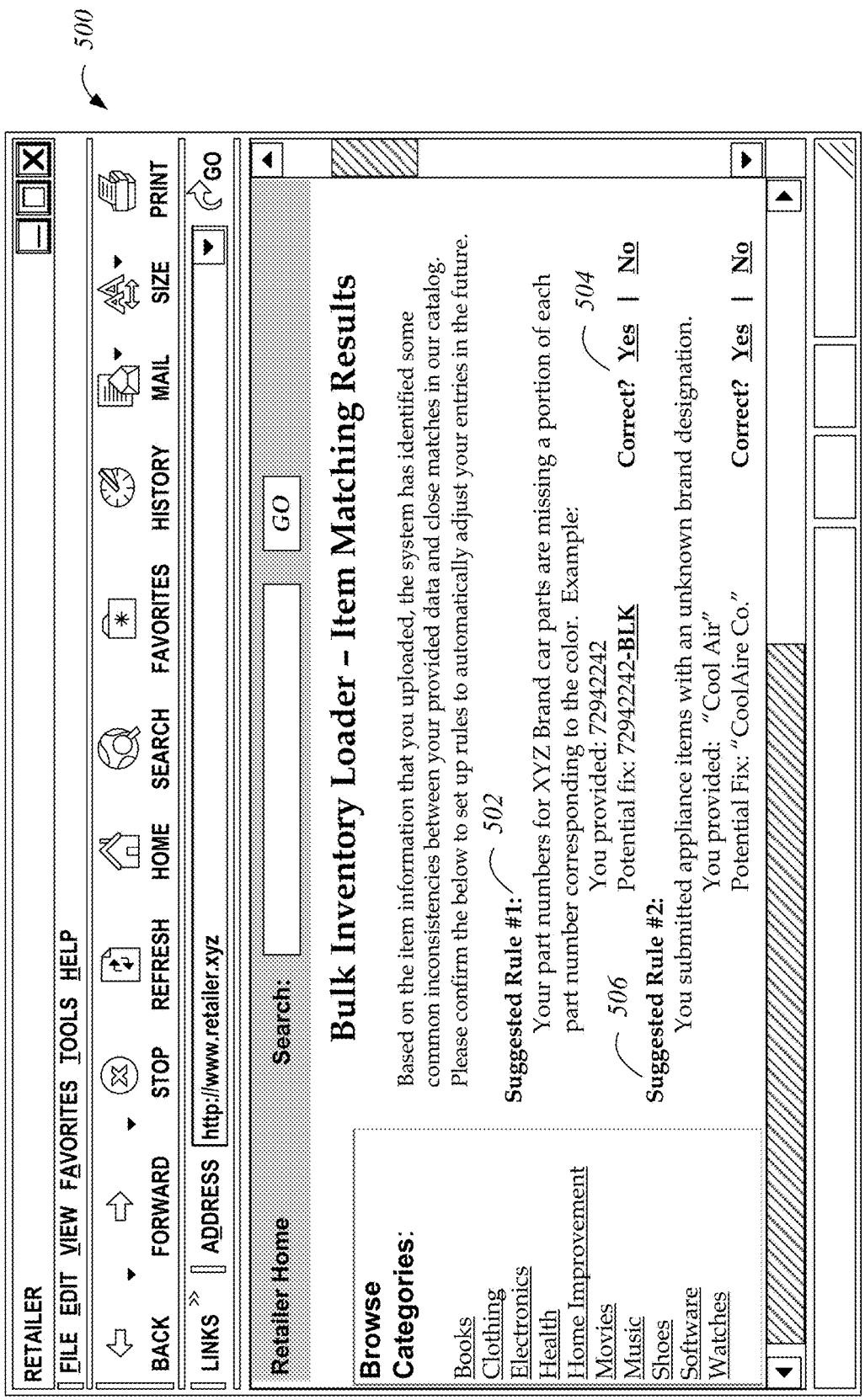
FIG. 5 is an illustrative user interface generated at least in part by an item management server that identifies rules determined based at least in part by comparing seller-submitted item information with item information for items stored in an electronic catalog.

FIG. 5 is an illustrative user interface 500 generated at least in part by the item management server 120 that identifies rules determined by the loading module 125 based at least in part by comparing seller-submitted item information with item information included in the electronic catalog stored in item data store 112. The illustrative user interface 500 may be generated, for example, after the loading module 125 has processed the item information submitted via user interface 400 discussed above according to the illustrative method 300 described above. Illustrative user interface 500 may be generated according to an embodiment in which rules determined by the loading module 125 are presented to the submitting seller or other user for approval before being stored and/or applied. In other embodiments, at least some of the determined rules may be automatically stored and/or applied without first presenting the rules for approval.

The illustrative user interface 500 includes indication of a first suggested rule 502 and a second suggested rule 506, each of which may have been determined by the loading module 125 based on a method similar to that described above with reference to FIG. 3. The first suggested rule 502 is identified as a modification that corrects the seller's submitted part numbers for XYZ Brand car parts by adding additional characters to the provided part number that correspond to a color of the item. If the user agrees that the rule appears to be a correct modification and that the correction corresponds to the intended item, the user may select the "Yes" option from confirmation options 504. The loading module 125 may then apply the rule and corresponding modification to the identified item and to other items belonging to the same bucket (as discussed in more detail above). The loading module 125 may additionally store the rule in rules data store 116 in order for the rule to be applied in the future to other submitted item information for items in the given bucket. If the user selects the "No" option from confirmation options 504, the loading module may not apply the rule to the identified item information or store the rule for future use. Instead, in some embodiments, the loading module may create a new item entry in the electronic catalog for the submitted item.

The second suggested rule 506 is identified in the illustrative user interface 500 as a modification to a value for a "brand name" item attribute (modifying "Cool Air," as submitted by the seller, to match a recognized brand of "CoolAire Co."). The suggested brand name modification may have been made by the loading module based on information other than just the brand name data, such as by determining that other item attribute values for the submitted item match item attribute values for an item with "CoolAire Co." as the brand name. In the illustrated embodiment, the user may similarly select whether to accept or decline the suggested second rule.

Figure 6:
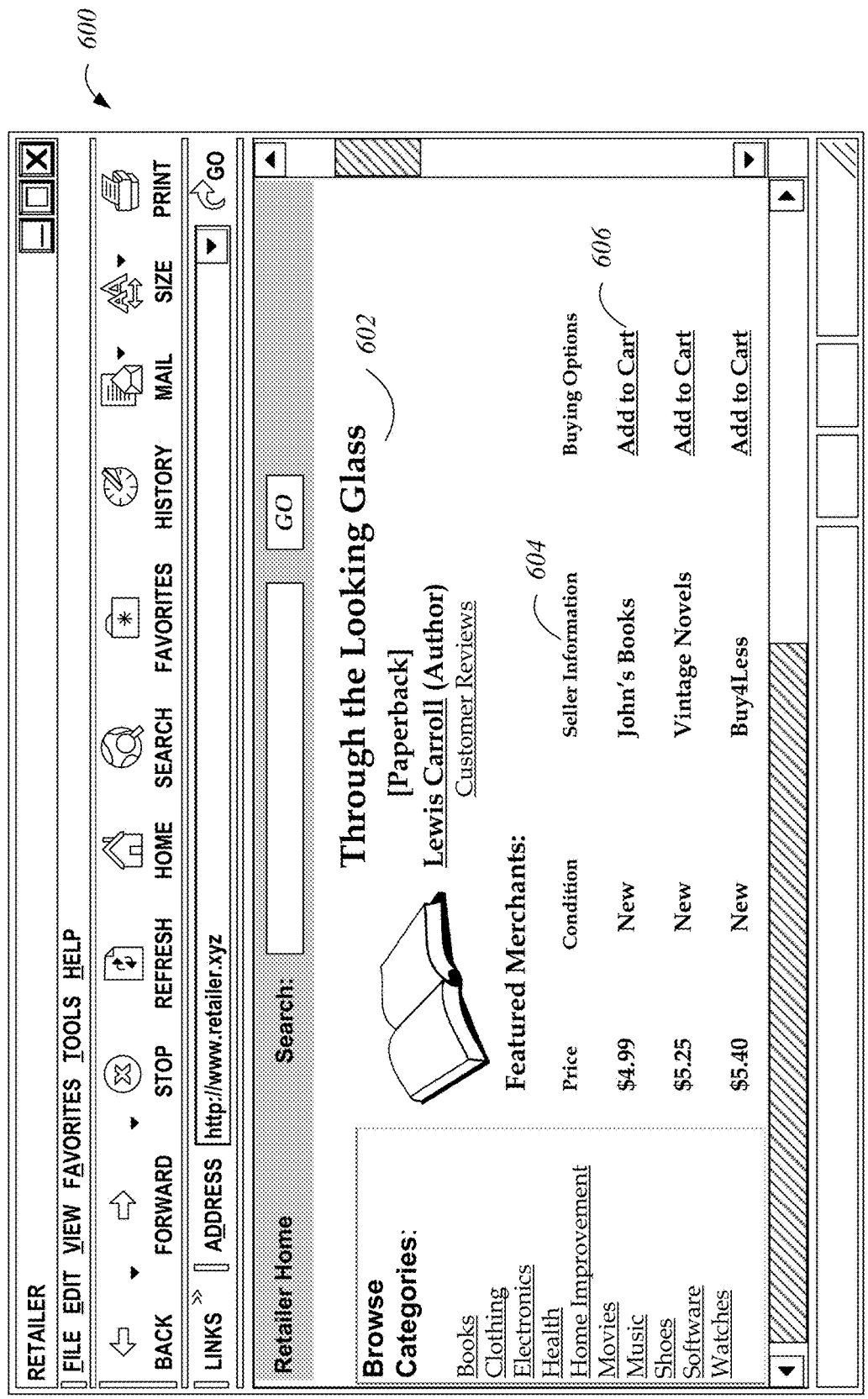
FIG. 6 is an illustrative user interface generated at least in part by a retail server that identifies a number of different sellers or merchants offering a given item for sale.

FIG. 6 is an illustrative user interface 600 generated at least in part by the retail server 110 that identifies a number of different sellers or merchants 604 offering a given item 602 for sale via the marketplace system 100. The illustrative user interface 600 may be presented, for example, to a shopper interesting in purchasing item 602 and that has requested to view the available sellers and corresponding prices for the item 602. As illustrated, the sellers listed for the item 602 include "John's Books," which as illustrated in user interface 400 discussed above, may be the seller that previously submitted bulk item information via user interface 400. Returning to user interface 400 discussed above, the field 404 in which the seller "John's Books" entered item information included an entry for an item named "Through the Looking Glass," along with additional item attribute values for the item.

The loading module 125 may have determined (such as by implementing a method similar to that described with reference to FIG. 3 above) that the submitted item information for the "Through the Look Glass" item corresponded to item 602 in the electronic catalog. This determination may have been made based at least in part by modifying the seller-submitted item information for the item based on one or more rules determined by the loading module 125 as a result of analyzing item information for a number of different submitted items. Based on the normalizations and/or modifications applied by the loading module 125, the item data store 112 may have been updated to reflect that the "John's Books" seller had one copy of the book for sale for $4.99. The retail server 110 may have then retrieved seller information from item data store 112 in order to generate the list of sellers for item 602 presented in user interface 600. The shopper viewing user interface 600 may select add to cart option 606 in order to begin an ordering process to purchase the book item 602 from the "John's Books" seller via the marketplace system 100.

The present disclosure often includes examples above of adding or updating information in an electronic catalog to include a new item and/or to update availability of an item based on seller-submitted data. As will be appreciated, the illustrative methods described herein are not limited to processing seller-submitted item information or to updating item entries or availability information. As one example, aspects of the present disclosure may be used to determine patterns for part numbers, item identifiers and/or other item attribute values in order to extrapolate information for additional items that are not included in the electronic catalog and that have not been submitted by any sellers. For example, the marketplace system 100 may search one or more potential item sources or external data stores to determine whether an item with a part number of "10345" exists for a given brand, if the loading module 125 determines that the electronic catalog includes items with part numbers "10344" and "10346" for the given brand. In some embodiments, the marketplace system 100 may automatically generate leads and/or send electronic communications to manufacturers, distributors, retailers and/or individuals to request that an item determined to be missing from the electronic catalog be offered for sale via the marketplace system 100.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by one or more general-purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code that include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
an electronic data store configured to store item information associated with each of a plurality of catalog items; and
a computing device in communication with the electronic data store, the computing device configured to:
receive, as delimited text data, item information for each of a plurality of items to be offered for sale by a seller, wherein the item information comprises a plurality of item attribute values for each of the plurality of items to be offered for sale by the seller;
parse the delimited text data to determine individual item attribute values for each of the plurality of items to be offered for sale by the seller;
for each of the plurality of items to be offered for sale by the seller, determine a close matching item for the item from among the plurality of catalog items, wherein the close matching item is determined based at least in part by identifying that item information stored in the electronic data store for the close matching item is similar to the received item information for the item, wherein at least one item attribute value for the close matching item is different than an item attribute value for a corresponding attribute in the received item information for the item;
for each of two or more pairings of an item offered for sale by the seller and a determined close matching item, determine a difference between item information of the item offered for sale by the seller and item information of the determined close matching item;
compare the determined differences to identify a common difference between (a) item information of a first item offered for sale by the seller and a first close matching item and (b) item information of a second item offered for sale by the seller and a second close matching item;
based at least in part on the identified common difference, generate a rule that when applied to item information of the first item offered for sale by the seller results in modified item information of the first item that matches item information of the first close matching item;

apply the rule to item information of a third item to be offered for sale by the seller such that the item information of the third item, as modified by applying the rule, matches item information of a first catalog item identified in the electronic data store;

update the item information of the first catalog item identified in the electronic data store to identify that the first catalog item is available from the seller;

determine that a fourth item to be offered for sale by the seller is not identified in the electronic data store; and store a new catalog item entry in the electronic data store that includes item information of the fourth item.

2. The system of claim 1, wherein the computing device is further configured to:

prior to applying the rule to the item information of the third item, determine that the third item belongs to a group of items to which the first item and the second item also belong.

3. The system of claim 2, wherein the third item is determined to belong to the group of items based on at least one of (a) the first item and the third item each being associated with the same brand as each other, or (b) the first item and the third item each being associated with a same item category as each other.

4. The system of claim 1, wherein individual item attribute values listed in the delimited text data are separated by at least one of a tab or a comma.

5. A system comprising:

an electronic data store configured to store an electronic catalog, wherein the electronic catalog comprises item information associated with each of a plurality of items; and a computing device in communication with the electronic data store, the computing device configured to:

receive, as delimited text data, item information for each of a plurality of new items to be added to the electronic catalog;

parse the delimited text data to determine item attribute values for each of the plurality of items to be added to the electronic catalog;

identify a subset of the plurality of new items as belonging to a group of items, wherein the subset of items are identified as belonging to the group based at least in part on at least one of (a) each item of the subset of items being submitted by the same user, (b) each item of the subset of items being associated with the same brand, or (c) each item of the subset of items being associated with the same item type;

for each of two or more new items of the plurality of new items to be added to the electronic catalog, determine a modification that when applied to the received item information for the new item results in modified item information for the new item that matches item information of an item identified in the electronic catalog;

apply the modification to a third new item other than the two or more new items, wherein the modification is applied to the third new item based at least in part on a determination that the third new item belongs to the group of items;

determine that the third new item with the modification applied matches an existing item stored in the electronic catalog; and update availability information stored in the electronic data store in association with the existing item based on the received item information associated with the third new item.

6. The system of claim 5, wherein the computing device is further configured to:

determine whether a fourth new item is identified in the stored electronic catalog information based at least in part by determining whether (a) the received item information for the fourth new item matches item information of an item identified in the stored catalog information, or (b) applying the modification to the received item information for the fourth new item results in the modified item information matching item information of an item identified in the stored catalog information; and when the determination is that the fourth new item is not identified in the stored electronic catalog information, store a new entry for the fourth new item in the electronic catalog.

7. The system of claim 5, wherein updating the availability information comprises storing information indicating that an additional unit of the existing item is available for sale.

8. The system of claim 5, wherein updating the availability information comprises storing information indicating that the existing item is available for purchase from a user that submitted the item information for the plurality of new items to be added to the electronic catalog.

9. The system of claim 5, wherein the computing device is further configured to receive confirmation of the modification from a user that submitted the received item information prior to applying the modification to the third new item.

10. A computer-implemented method comprising:

as implemented by a computing device configured with specific executable instructions, receiving, as delimited text data, item information for each of a plurality of submitted items to be added to an electronic catalog;

parsing the delimited text data to determine item attribute values for each of the plurality of submitted items to be added to the electronic catalog;

identifying a subset of the plurality of submitted items as belonging to a group of items, wherein the subset of items are identified as belonging to the group based at least in part on the subset of items having an item attribute in common with each other;

for at least a first submitted item of the submitted items belonging to the group, determining a modification that when applied to the received item information for the first submitted item results in modified item information for the first submitted item that matches item information of an item previously identified in the electronic catalog;

applying the modification to item information for a second submitted item that is different from the first submitted item, wherein the modification is applied to the item information for the second submitted item based at least in part on a determination that the second submitted item belongs to the group of items;

determining that the second submitted item with the modification applied matches an existing item identified in the electronic catalog; and updating availability information stored in association with the existing item identified in the electronic catalog based on the received item information associated with the second submitted item.

11. The computer-implemented method of claim 10, further comprising storing, in a data store, a rule identifying the modification, such that the rule when retrieved and applied to inputted item information results in the inputted item information being modified according to the modification.

12. The computer-implemented method of claim 11, wherein a confidence score is stored in association with the rule, wherein the confidence score is determined based at least in part on a number or percentage of the plurality of submitted items belonging to the group that match item information of an item previously identified in the electronic catalog when the rule is applied.

13. The computer-implemented method of claim 12, further comprising applying the rule to item information received from a second user based at least in part on a determination that the confidence score meets a threshold, wherein the rule was generated based on item information received from a first user.

14. The computer-implemented method of claim 10, wherein the modification is applied to the second submitted item based at least in part on a determination that the modification, when applied to the item information for the second submitted item, results in modified item information that matches item information of a second item previously identified in the electronic catalog.

15. The computer-implemented method of claim 10, wherein the modification comprises modifying a unique item identifier.

16. The computer-implemented method of claim 15, wherein modifying the unique item identifier comprises adding an additional alphanumeric character to a submitted item identifier.

17. The computer-implemented method of claim 16, wherein the additional alphanumeric character is derived at least in part from an item attribute value included in the received item information.

18. The computer-implemented method of claim 10, wherein the modification comprises modifying at least one of a part number associated with an item, an item brand or an item title.

19. A computer-readable, non-transitory storage medium storing computer-executable instructions that, when executed by a computer system, configure the computer system to perform operations comprising:
    receiving, as delimited text data, item information for each of a plurality of submitted items to be added to an electronic catalog;
    parsing the delimited text data to determine item attribute values for each of the plurality of submitted items to be added to the electronic catalog;
    identifying a subset of the plurality of submitted items as belonging to a group of items, wherein the subset of items are identified as belonging to the group based at least in part on the subset of items having an item attribute value in common with each other;
    for at least a first submitted item of the submitted items belonging to the group, determining a modification that when applied to the received item information for the first submitted item results in modified item information for the first submitted item that matches item information of an item previously identified in the electronic catalog;
    applying the modification to item information for a second submitted item that is different from the first submitted item, wherein the modification is applied to the item information for the second submitted item based at least in part on a determination that the second submitted item belongs to the group of items;
    determining that the second submitted item with the modification applied matches an existing item stored in the electronic catalog; and
    updating availability information stored in association with the existing item stored in the electronic catalog based on the received item information associated with the second submitted item.

20. The computer-readable, non-transitory storage medium of claim 19, wherein the modification is applied to the second submitted item based at least in part on a determination that the modification, when applied to the item information for the second submitted item, results in modified item information that matches item information of the existing identified in the electronic catalog.

21. The computer-readable, non-transitory storage medium of claim 19, wherein the modification is applied to the item information for the second submitted item based at least in part on a confidence score determined for the modification.

22. The computer-readable, non-transitory storage medium of claim 21, wherein the confidence score is determined based at least in part on a number or percentage of the plurality of submitted items belonging to the group that match item information of an item previously identified in the electronic catalog when the rule is applied.

23. The computer-readable, non-transitory storage medium of claim 19, wherein the modification is determined based at least in part on a retrieved table entry that associates a submitted item attribute value with a common incorrect value.

* * * * *